H. BRACKETT.
Harvester Rake.
No. 89,731.
Patented May 4, 1869.
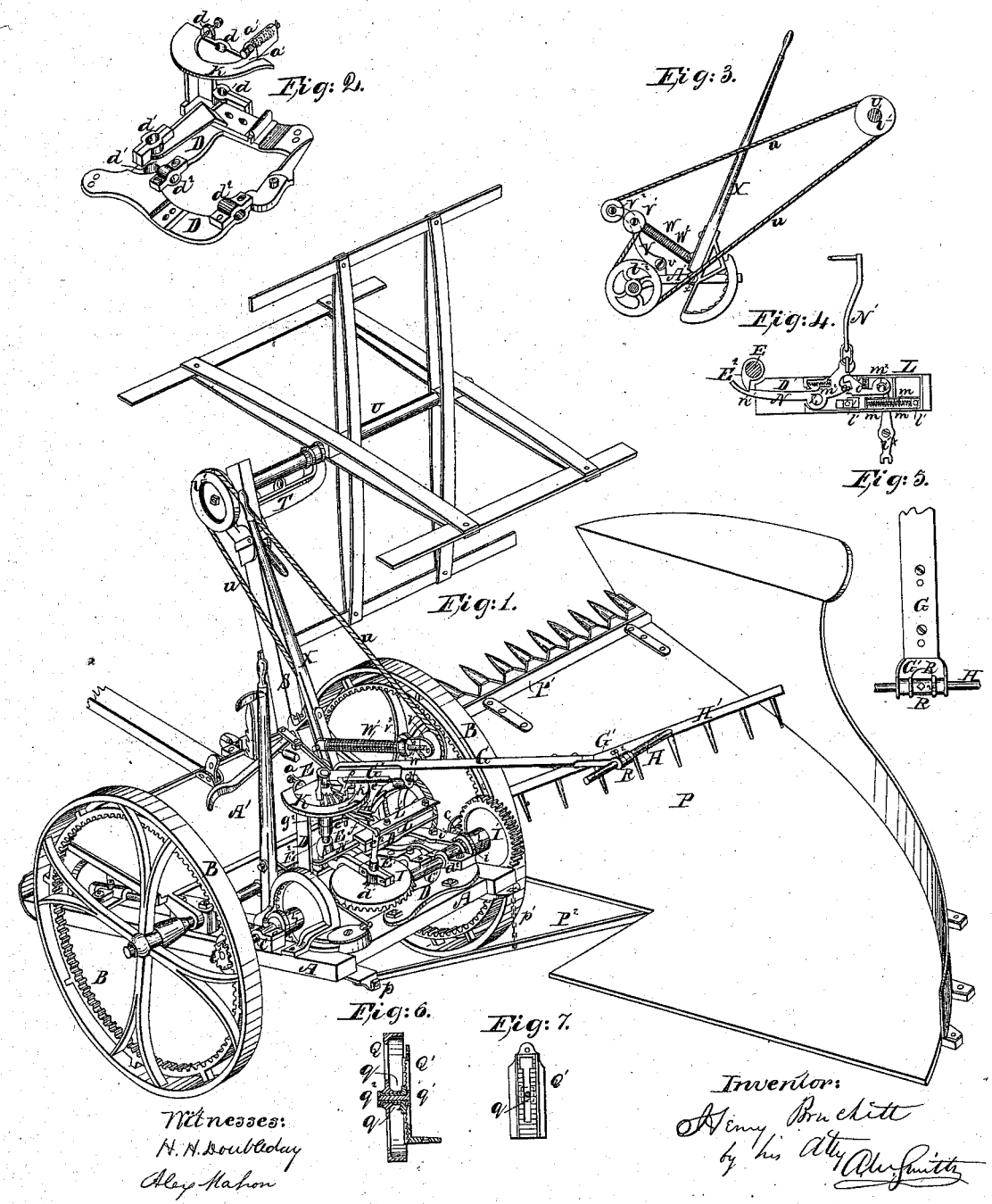

UNITED STATES PATENT OFFICE.

HENRY BRACKETT, OF VALLEY FALLS, NEW YORK.

IMPROVEMENT IN HARVESTER-RAKES.

Specification forming part of Letters Patent No. 89,731, dated May 4, 1869.

*To all whom it may concern:*

Be it known that I, HENRY BRACKETT, of Valley Falls, county of Rensselaer, and State of New York, have invented certain new and useful Improvements in Harvester-Rakes, of which the following is a full, clear, and exact description, reference being had to the accompanying drawing, making a part of this specification, in which—

Figure 1 is a perspective view of a reaping-machine with my improvements applied. Fig. 2 represents the rake-frame detached. Fig. 3 is a side elevation of the segment-lever and pivoted reel-guide. Fig. 4 is a plan view of the shifting-box, with the cap or cover removed to show the devices for locking the rake out of gear, &c. Fig. 5 is a plan view of the outer end of the vibrating rake-arm, showing the manner of attaching the rake-stale thereto. Fig. 6 is a vertical section through the grain-wheel and its slotted supporting-plate, and Fig. 7 is a side elevation of said slotted supporting-plate.

Similar letters of reference denote corresponding parts in all the figures.

My improvements, so far as they relate to the construction and organization of the machine for mowing or for cutting grass or grain, are described in another application of even date herewith, and the machine need not be described any further here, therefore, than is required to show the application thereto of my improvement in the rake attachment or discharging apparatus, to which the present application relates.

The nature of these improvements will be understood from the following detailed description with reference to the drawing.

A represents a main frame, mounted upon two independent drive-wheels, B, from which motion is communicated to a pinion or bevel-wheel shaft, C, through pinions mounted upon the opposite ends of said shaft, and connected thereto by backing-ratchets.

D is a metallic rake-frame, mounted on the main frame A, and provided with suitable bearings for the rake-shaft or pivot and the rake-actuating devices, hereinafter described. The construction of this rake-frame is shown in the detached view, Fig. 2.

In bearings $d$ in said frame D is mounted a vertical rock-shaft, E, to the upper end of which a horizontal shaft or pivot, $e$, is rigidly secured, on which is mounted the vibrating rake-arm G, provided at its outer swinging end with an adjustable sleeved plate, G', in which is secured the pivoted rake-stale H, carrying the rake-head H', as hereinafter set forth.

The rock-shaft E is provided with a crank-arm, $e^1$, which is connected by a pitman, $f$, with a crank-arm, $e^2$, on a second vertical shaft, $E^1$, also mounted in bearings $d^1$ in the frame D. The shaft $E^1$ has keyed to it a crown or bevel wheel, I, to which motion is communicated by a bevel-pinion on the inner end of a horizontal shaft, C', mounted in bearings $d^2$ in the rear end of frame D. The outer end of shaft C' is armed with a loose spur-wheel, I', which meshes with and is driven by a spur-pinion, $c$, on the bevel-wheel or pinion-shaft C.

A sliding feathered clutch, $i'$, on shaft C' serves to engage the wheel I' with shaft C', when desired, and thereby, through its bevel-pinion, engaging with and driving crown or bevel wheel I and cranks $e^2$ $e^1$ and rake-shaft E to vibrate the rake-arm and rake in a manner that will be readily understood. The rake-arm G, or a flanged supporting-plate, G×, to which the inner end of said arm is attached, is provided at its heel or pivoted end with a beveled toothed segment, $g$, centering at the point of intersection of the shafts or pivots E $e$, and a sleeve, $g^2$, mounted loosely on shaft E, between its vibrating arms $e$ and $e^1$, is provided on its upper end with a beveled segment, $g^1$, and which is the counterpart of and engages with the segment $g$ on the rake-arm, and serves to impart the necessary rising and falling movements to the rake, as follows: The sleeve $g^2$, with which segment $g^1$ is connected, is mounted upon and turns with the rock-shaft E during a part of its movement in both directions, but has its throw limited by stops $a$ $a'$, either or both of which may be regulated by set-screw, as shown at $a$, if desired.

The stops are so regulated as to arrest the movement of the sleeve $g^2$ before the throw of the arm $e$, resulting from its connection with the crank $e^2$, is completed. Consequently the continued movement of shaft E, carrying with it the arm $e$, on which the rake-arm G and its segment-pinion $g$ are pivoted, causes said segment to roll over the segment $g^1$, rocking or turning the rake-arm G on pivot $E^2$ and raising and lowering the rake as required.

The rake-arm or flanged supporting-plate $G^×$ has connected to it an arm, $h$, the outer end of which has an angular projection or pin, $h'$, provided, if desired, with a friction-roller, which is made by the vibration of the rake-arm to traverse a semicircular horizontal way, K, mounted on uprights in frame D. A hinged latch or gate, $k$, permits the pin $h'$ to rise through the way or track K when the rake is elevated by the action of the segments $g g^1$. At the termination of the discharge stroke of the rake, after pin $h'$ has passed through the gate $k$, the gate closes and the pin traverses the upper face of the way K during its return stroke, thereby maintaining the rake in an elevated position and vibrating the two segments until the pin $h'$ escapes from the forward inner end of track K, and thereby permits the rake to descend upon the platform in proper position for removing the grain accumulated thereon.

The stop $a'$, which regulates the extent of the forward throw of the rake-arm, is provided with a spring, which acts against the sleeve-segment $g^1$, and which serves, when the pin $h'$ escapes from track K, to force or rotate segment $g^1$ backward, and thereby to assist the descent of the rake upon the platform. The forward inner end of the track K is curved slightly downward to permit the rake to descend slightly before reaching the end of its return or forward movement, in such manner as to cause it to reach underneath the reel-arms into proper position to grasp the accumulated grain.

$D'$ is a horizontal base-plate attached to or forming a part of frame D, upon which is mounted a sliding shipping-box, L. The base-plate $D'$ is provided with uprights or studs $l'$ $l'$, which project through slots in the bottom of the sliding box L, and serve to regulate the movement of said box. The box L is divided into compartments, in one of which, $m$, is placed a spring, $m^1$, resting at one end in contact with the fixed stud $l$, and at its opposite end against a transverse partition or upright in the sliding box, so arranged that the tension of the spring acts to force said partition away from stud $l'$, thereby forcing the sliding box L inward.

The forward end of a pivoted shipping-lever, $i^×$, is connected with the sliding box by a loop attached to the bottom thereof and passing through a slot in the base-plate. The rear end of said lever is connected with the sliding clutch $i'$, which engages the spur-wheel $I'$ with or disengages it from its shaft $C'$, the relation of parts being such that when the sliding box L is held inward by spring $m^1$ the clutch is moved outward, engaging said wheel $I'$ with shaft $C'$.

N is a bent lever, pivoted at $n$ in the sliding box L, and moving therewith. The form of said lever is shown in Fig. 4, the outer end extending to a point near the vertical rock-shaft E, being slightly curved and provided with a shoulder at $n'$, which engages with a cam, $E^2$, on said shaft, as hereinafter set forth. A spring, $m^2$, located in a socket in box L, serves to hold the lever in proper position to engage with the cam $E^2$.

O is a pawl or dog, also pivoted at one end (at $n'$) in and sliding with box L. The free end of said dog is notched to receive a spur, $o$, on lever N, which serves to actuate the dog in one direction—viz., for releasing it from the fixed stud $l'$—a spring, $m^×$, serving to move the dog in the opposite direction to cause it to engage with stud $l'$. The forward end of lever N is linked to a pivoted treadle, $N'$, arranged in convenient position to be operated by the foot of the driver riding in his seat on the machine, and in such manner that the driver, by simply pressing upon the forward end of said lever $N'$, draws forward the forward or short end of lever N, and with said last-named lever, through spur $o$, the free end of dog O, thereby disengaging it from spur $l'$, when the spring $m^1$, acting upon the sliding box L, forces it, together with forward end of shipping-lever $i^×$, inward, thereby engaging the wheel I with its shaft, and operating the rake through the mechanism described. By this movement of the box the dog O is caused to slide by the spur $l'$, and is consequently held disengaged therefrom until the rake has swept the platform, discharging the grain therefrom, and is elevated for and starts upon its return stroke, when the cam E, engaging with the lever N, forces it, together with box L and forward end of shipping-lever $i^×$, outward, disengaging the rake-driving wheel from its shaft, and carrying the dog O into position to again be acted upon by spring $m^×$, and made to engage with spur $l'$ for locking the rake out of gear, where it remains until again thrown into gear by the hand or foot of the attendant operating lever $N'$ and releasing dog O, as explained. The same action which releases the dog O also releases the cam $E^2$ on the rake-shaft from lever N, thereby allowing the latter to slide by the cam, and permitting the rake-shaft to complete its return stroke.

By this arrangement above described it will be seen that the rake is automatically thrown out of gear each time after it has completed its discharge of the grain from the platform and has been elevated for its return stroke, while at the same time, if the condition of the crop is such as to require it, the driver, by keeping his foot on treadle N, can cause the rake to operate continuously and without interruption.

The platform used in connection with our improved rake apparatus herein described is represented at P, and is connected at its forward end to a hinged finger-bar, $P^1$, arranged in advance of the drive-wheels B. The platform is provided with a curved rim on its outer or grain side, to conform to the path of the outer end of the rake-head H, and is sufficiently elongated to pass the main frame and drive-wheel and to permit the discharge of the grain from its rear inner edge behind said frame and out of the way of the machine and team on their next round. The rear of the platform is connected with and supported by the main frame by a brace-rod, $P^2$, hinged to the frame at $p$, about in the same longitudinal line with the hinge-coupling of the main shoe or finger-bar. An adjustable link or chain, $p'$, serves to adjust brace $P^2$ for varying the height of the platform at its rear end.

The outer or grain side of said platform is supported at the required height by a grain-wheel, Q, (shown in section, Fig. 6,) and made adjustable as follows: $Q'$ represents a slotted supporting-plate attached to the grain-guard or binding-board. The outer face of said plate is ribbed, and matches a corresponding face on the inner flanged end of a tubular sleeve or axle, $q$, on which the wheel Q is mounted. A bolt, $q^1$, passing through the slot in plate Q, is provided with an enlarged head, which prevents its withdrawal from said plate, which, in connection with a nut, $q^2$, on the outer end of said axial bolt, serves to hold the wheel upon its tubular axle, and at the same time, through the ribbed faces, to the sleeve and supporting-plate $Q'$, to hold the said wheel at any height relative to the platform to which it may be adjusted.

In order that the rake may adapt itself to the varying positions of the hinged platform, which conforms to the surface of the ground, the rake-stale is allowed a slight rolling motion in its sleeved carrying-arm $G'$, the connection with said arm being made as follows for that purpose: The sleeve in the end of plate $G'$ is forked and receives between its arms a ferrule, R, through which also the rake-handle H passes, and to which it is fastened by a set-screw, $r$, which permits its adjustment as desired, and which, when set, prevents end play of said handle.

A spur, $r'$, on the ferrule enters a socket in the sleeve of arm or plate G, and, being somewhat less in width than said socket, a slight rolling motion of the ferrule and rake-handle is permitted, sufficient to allow the rake-head to accommodate itself to the position of the platform.

The metallic sleeve-plate $G'$ is provided with a number of perforations, or it may be slotted transversely, if preferred, to permit its adjustment upon arm G for setting the rake in or out relative to the platform, as the relation of the platform to the main frame may require.

The rake-stale H is made of light elastic material, which will allow the rake to yield slightly to conform to any movement of the platform in following the surface of the ground.

S is the single-reel post, pivoted at its lower end to a metallic support attached to the main shoe, and provided with an adjustable bracket, T, in bearings in which the rest-shaft U is mounted. Said shaft is provided at its inner end with a driving-pulley, $U^1$, to which motion is communicated by cord or band $u$ from a pulley, $U^2$, on the main axle.

V is a guide-pulley standard, pivoted at $v$ to the seat and tongue-plate or frame $A'$, and armed at its upper free end with guide-pulleys $v^1 v^2$, over which the reel-driving belt $u$ passes, as shown in Fig. 3. Standard V is also provided at its upper end with a perforated swiveling eye or loop, $v^3$, through which one end of an adjustable link, $w$, passes, the other end of said link being connected to the lifting segment-lever X near its pivot $x$.

A spring, $w'$, surrounds the link, and serves to force the free end of standard V, with its guide-pulleys $v^1 v^2$, away from the lever, and to keep the reel-belt always taut.

In adjusting the height of the cutters through segment-lever X, the movement of said lever also serves to adjust the pivoted standard V in such manner as to compensate for the varying distance of the reel-shaft from the main axle.

The length of the link W and the point of its attachment to the segment-lever may be varied as circumstances may require to suit the length of the driving-belt, or for varying the tension of spring $w'$.

Having now described the invention, what I claim as new under this application, and desire to secure by Letters Patent, is—

1. The removable rake-frame D, provided with the several bearing for the horizontal and vertical rake and crank shafts, arranged substantially as described.

2. The curved horizontal way or track K, provided with the gate or latch $k$ and the adjustable and spring stops $a\ a'$, substantially as described.

3. The horizontal semicircular track or way K, mounted upon the removable rake-frame, substantially in the manner shown and described.

4. The pivoted rake-arm, provided with the arm and spur $h\ h'$, operating in combination with the curved track K, gate or latch $k$, and incline $k'$, as set forth.

5. The vertical rock-shaft E, in combination with the horizontal rake-arm shaft or pivot $e$, sleeve $g^2$, and beveled segments $g\ g^1$, arranged substantially as described.

6. Mounting the rake-shipping devices upon the removable rake-frame in such manner that said devices shall be removed from or applied to the machine with said rake-frame.

7. The vertical rake-shaft provided with the shipping-cam for automatically throwing the rake out of gear.

8. The reciprocating shipping-box L, in combination with the rake-shaft and shipping-levers for automatically throwing the rake out of gear.

9. The arrangement of shipping-levers, dog, and springs, in combination with the sliding box L or its equivalent, substantially as described.

10. Pivoting the rake-arm G upon a horizontal arm or shaft keyed to and turning with the vertical rock-shaft.

11. Pivoting the rake-handle to the swinging end of the vibrating rake-arm to adapt the rake-head to conform to the position of the hinged platform, substantially as described.

12. The rake-handle H, in combination with the adjustable plate or sleeved extension of the rake-arm, for adjusting the rake-head, as described.

13. The pivoted reel-guide standard V, in combination with the yielding or spring brace or support, substantially as and for the purpose set forth.

14. The combination of the pivoted reel-guide standard with the lifting-lever, for the purpose set forth.

15. The adjustable connection of the grain-wheel with the platform by means of the ribbed slotted plate $Q'$, axle-sleeve $q$, and through-bolt $q^1$, combined and operating as described.

HENRY BRACKETT.

Witnesses:
E. F. FROST,
B. ALLEN.